(12) United States Patent
Grabowski et al.

(10) Patent No.: US 7,034,254 B2
(45) Date of Patent: Apr. 25, 2006

(54) HEATED DELIVERY SYSTEM

(75) Inventors: Brian M. Grabowski, Brunswick, OH (US); Rao Atreyapurapu, Lakewood, OH (US)

(73) Assignee: The Scott Fetzer Company, Westlake, OH (US)

( * ) Notice: Subject to any disclaimer, the term of this patent is extended or adjusted under 35 U.S.C. 154(b) by 0 days.

(21) Appl. No.: 10/842,981

(22) Filed: May 11, 2004

(65) Prior Publication Data

US 2005/0252904 A1    Nov. 17, 2005

(51) Int. Cl.
*A21B 1/52* (2006.01)
*F24H 7/00* (2006.01)
*H05B 3/22* (2006.01)
*H05B 3/28* (2006.01)

(52) U.S. Cl. .............. 219/387; 219/523; 219/530; 219/533; 219/544; 219/548

(58) Field of Classification Search ........... 219/387, 219/521, 523, 530, 533, 540, 544, 548
See application file for complete search history.

(56) References Cited

U.S. PATENT DOCUMENTS

| | | | |
|---|---|---|---|
| 1,377,092 A | 5/1921 | Phaneuf | |
| 1,683,889 A | 9/1928 | Hayne | |
| 2,577,870 A | 12/1951 | Aston | |
| 3,051,582 A | 8/1962 | Muckler et al. | |
| 3,231,718 A * | 1/1966 | Vasile | 219/450.1 |
| 3,521,030 A | 7/1970 | Maahs | |
| 3,608,627 A | 9/1971 | Shevlin | |
| 3,721,799 A | 3/1973 | Carlstrom | |
| 3,721,803 A | 3/1973 | DiStefano | |
| 3,746,873 A | 7/1973 | Frey et al. | |
| 4,134,004 A * | 1/1979 | Anderson et al. | 219/387 |
| 4,374,312 A * | 2/1983 | Damron | 219/548 |
| 4,429,216 A | 1/1984 | Brigham | |
| 4,578,814 A | 3/1986 | Skamser | |
| 4,700,054 A | 10/1987 | Triplett et al. | |
| 4,816,646 A * | 3/1989 | Solomon et al. | 219/387 |
| 4,982,722 A * | 1/1991 | Wyatt | 126/400 |
| 4,983,814 A | 1/1991 | Ohgushi et al. | |
| 5,404,808 A | 4/1995 | Smith et al. | |
| 5,454,471 A * | 10/1995 | Norvell | 206/545 |
| 5,750,962 A * | 5/1998 | Hyatt | 219/528 |
| 5,824,996 A | 10/1998 | Kochman et al. | |
| 5,837,971 A | 11/1998 | Lee | |
| 5,880,435 A * | 3/1999 | Bostic | 219/387 |
| 5,884,006 A * | 3/1999 | Frohlich et al. | 392/339 |
| 5,954,984 A | 9/1999 | Ablah et al. | |
| 6,018,143 A | 1/2000 | Check | |
| 6,019,143 A * | 2/2000 | Marik et al. | 140/93.2 |
| 6,057,530 A | 5/2000 | Gurevich | |

(Continued)

FOREIGN PATENT DOCUMENTS

FR    2521408    8/1983
GB    2056264    3/1981

*Primary Examiner*—Joseph M. Pelham
(74) *Attorney, Agent, or Firm*—Pearne & Gordon LLP

(57) ABSTRACT

A heated delivery system for pizza and the like including a thermally insulated receptacle, an electrical resistance heating unit having a heat storing shell molded from thermosetting resin, and an electrical resistance heating member within the shell, the member having the capacity of being heated and maintained at a desired temperature. The heating member may be silicone rubber containing resistance heating elements, and its temperature may be regulated by a suitable temperature control, such as a thermostat or other means.

5 Claims, 4 Drawing Sheets

U.S. PATENT DOCUMENTS

| | | |
|---|---|---|
| D430,993 S | 9/2000 | Nottingham et al. |
| 6,121,578 A | 9/2000 | Owens et al. |
| 6,150,635 A * | 11/2000 | Hannon et al. ............. 219/386 |
| 6,169,270 B1 | 1/2001 | Check |
| 6,222,160 B1 | 4/2001 | Remke et al. |
| D441,613 S | 5/2001 | Nottingham et al. |
| 6,229,123 B1 | 5/2001 | Kochman et al. |
| 6,232,585 B1 | 5/2001 | Clothier et al. |
| D443,171 S | 6/2001 | Chen |
| 6,248,981 B1 | 6/2001 | Check |
| 6,281,477 B1 * | 8/2001 | Forrester et al. ............ 219/387 |
| 6,300,599 B1 | 10/2001 | Owens et al. |
| 6,329,644 B1 | 12/2001 | Hyatt |
| 6,353,208 B1 | 3/2002 | Bostic et al. |
| 6,369,369 B1 | 4/2002 | Kochman et al. |
| 6,384,387 B1 | 5/2002 | Owens et al. |
| 6,403,935 B1 | 6/2002 | Kochman et al. |
| 6,415,501 B1 * | 7/2002 | Schlesselman et al. ..... 219/548 |
| 6,433,313 B1 * | 8/2002 | Owens et al. ............... 219/387 |
| 6,452,138 B1 | 9/2002 | Kochman et al. |
| 6,486,443 B1 | 11/2002 | Bostic et al. |
| 6,489,595 B1 | 12/2002 | Check et al. |
| 6,563,094 B1 | 5/2003 | Kochman et al. |

* cited by examiner

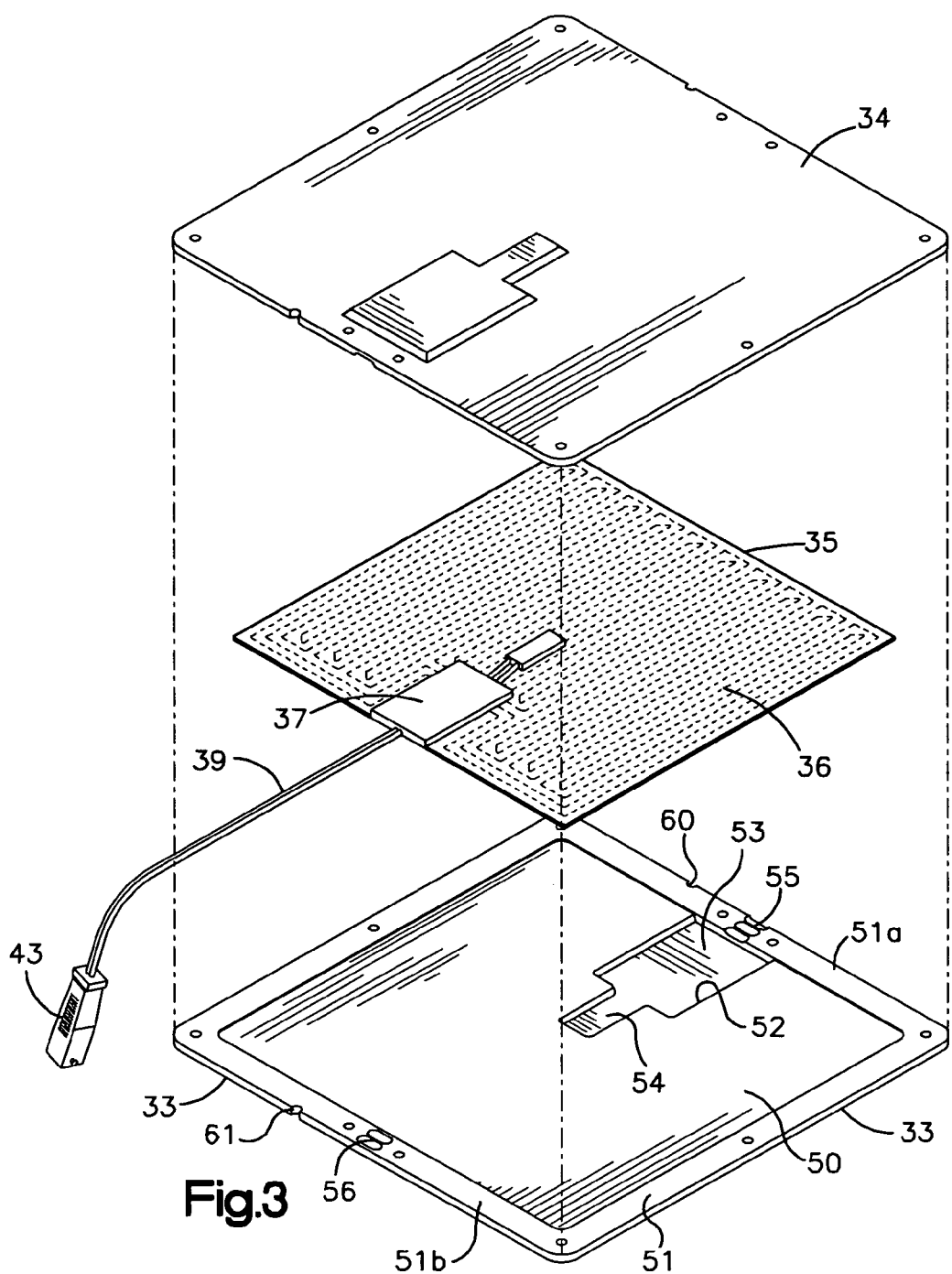
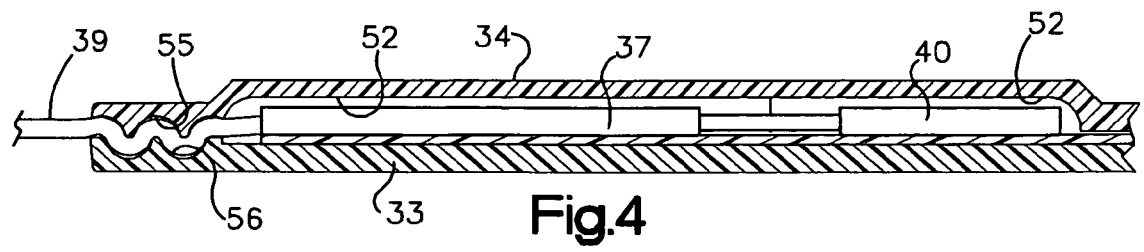

US 7,034,254 B2

HEATED DELIVERY SYSTEM

TECHNICAL FIELD

The present invention relates generally to heated delivery systems, and more specifically to a new heated delivery system that is capable of maintaining a contained product, particularly pizza, at a desired elevated temperature while minimizing condensation within the receptacle, thus preventing products from becoming soggy, after preparation and during the time of delivery.

BACKGROUND OF THE INVENTION

The desirability of keeping products such as pizza at an elevated and controlled temperature after it is has been prepared, and maintaining it at a desired high temperature during delivery is well recognized. Various transport containers and carriers have been devised in the past in efforts to meet this need. Many of these prior art devices are composed of several components that take up valuable space in small pizza shops, add additional operational steps, are complex to operate, and are dependent on a single, relatively expensive, power conversion unit. Because of the expense and operational difficulties that have been encountered, there has continued to be a need for a durable, low cost, dependable heated delivery system that has a long service life and can be afforded by small business enterprises, such as pizza shops.

SUMMARY OF THE INVENTION

Accordingly, it is an object of the present invention to provide a low cost heated delivery system which can be inexpensively made, has a long service life, and is capable of maintaining contained products, such as pizza, at a desired high temperature while minimizing condensation within the receptacle, thus preventing products from becoming soggy, after preparation and during the time of delivery.

In accordance with a preferred embodiment, the new heated delivery systems of the invention comprises a thermally insulated receptacle preferably made of a flexible, fabric material sized to accept one or more objects to be delivered, an opening providing access to the interior of the receptacle, a closure flap for the opening, and a pouch on an interior wall of the receptacle, the pouch having a mouth that can be opened and closed. An electrical resistance heating unit is insertable into the pouch through its mouth. The heating unit comprises a heat storing shell made of thermosetting resin that will not soften at elevated temperatures of heating, and an electrical resistance heating member within the shell. In a particularly preferred embodiment, the resistance elements are embedded in a silicone rubber member. Provision is made for connecting the heating unit to an ordinary power source, e.g. a 110/220 volt outlet. In a preferred embodiment, this is accomplished by an electrical disconnect coupled to the heating unit permitting it to be connected and disconnected under power from the power source.

A temperature control also is connected to the heating member for regulating its temperature. In the disclosed embodiment, the control is a thermostat. If desired, an electronic control can take the place of a thermostat.

An important characteristic of the invention is that it lends itself to an economical manufacturing operation that can be quickly and easily carried out. To this end, the thermosetting shell of the heating unit is preferably composed of two identical plates that can be made from a single cavity mold. The plates accept the silicone rubber heating member containing the resistance wires and are riveted or otherwise secured at their edges. Thus assembled, the heating unit can be simply inserted into the pouch to provide dependable and safe heating of the products within the receptacle, such as boxed pizzas. The heating unit is easily removed from the pouch so that the receptacle can be cleaned.

In use, the heating unit is connected to an electrical outlet so that receptacle heating can be initiated and maintained until the time of delivery. Since the system is continuously powered, it serves as a heated, holding oven until disconnected for delivery. Doubling as a heated, holding oven reduces the need for additional space and equipment in a pizza shop. The unique construction of the thermosetting shell of the heating unit effectively stores heat after the system is disconnected from the power source. It has been found that the heating system will maintain its contents within 10–20° F. of boxing temperature for up to forty-five minutes, thereby assuring lasting delivery heat after storage.

Other advantages and a fuller understanding of the invention will be had from the following detailed description and the accompanying drawings.

DESCRIPTION OF THE DRAWINGS

FIG. 3 is an exploded view of the heater element;

FIG. 4 is an enlarged, fragmentary view taken on the line 4—4 of FIG. 1;

DESCRIPTION OF PREFERRED EMBODIMENT

Figure 1:
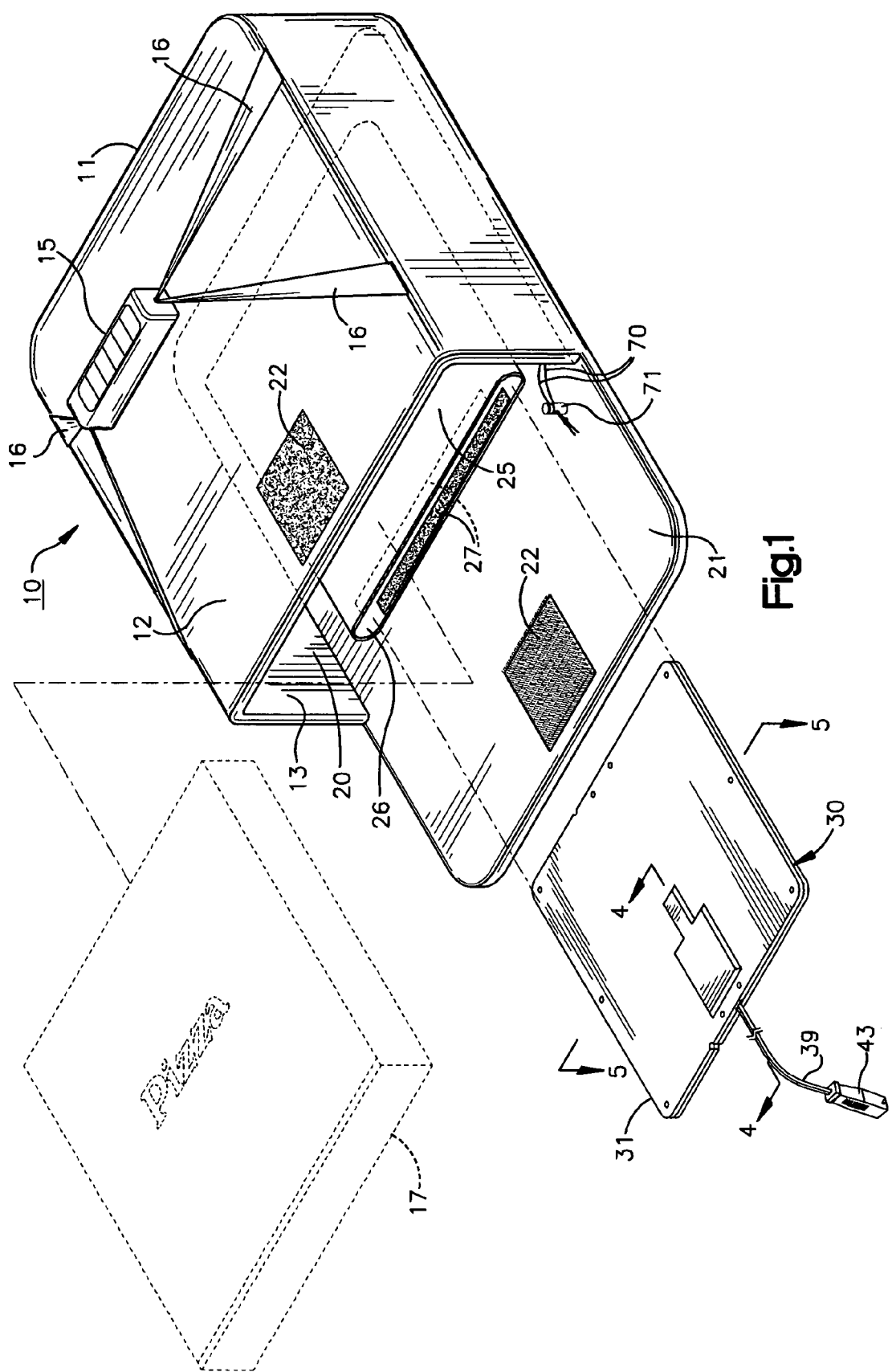
FIG. 1 is an exploded, perspective view of the preferred embodiment of the invention.

Referring now to the drawings, the heated delivery system of the invention is generally designated by reference numeral 10 and is shown to include a thermally insulated receptacle 11. The receptacle 11 is preferably formed from a soft, flexible fabric type material including an outer wear resistant layer 12 and an inner lining 13 which are sewn together and have insulating material therebetween. Both the outer layer 12 and the lining 13 are washable. A carrying handle 15 is attached to opposite sides of the receptacle by straps 16.

The receptacle 11 has an interior sized to receive one or more products to be delivered, for example, a pizza box 17, an opening 20 providing access to the interior, and a closure flap 21. The flap 21 is formed by an extension of one of the receptacle walls and can be folded to close the opening 20. As shown, hook and loop closure patches 22 are provided on the flap 21 and the top of the receptacle 11 to secure the flap when it has been folded to close the opening 20.

A pouch 25 is attached to an interior wall of the receptacle 11 and has a mouth 26 facing the receptacle opening 20. Hook and loop strips 27 are provided on the inner lips of the mouth 26 so that it can be selectively sealed closed and opened. The pouch 25 is sized to receive an electric heating unit 30.

Figure 5:
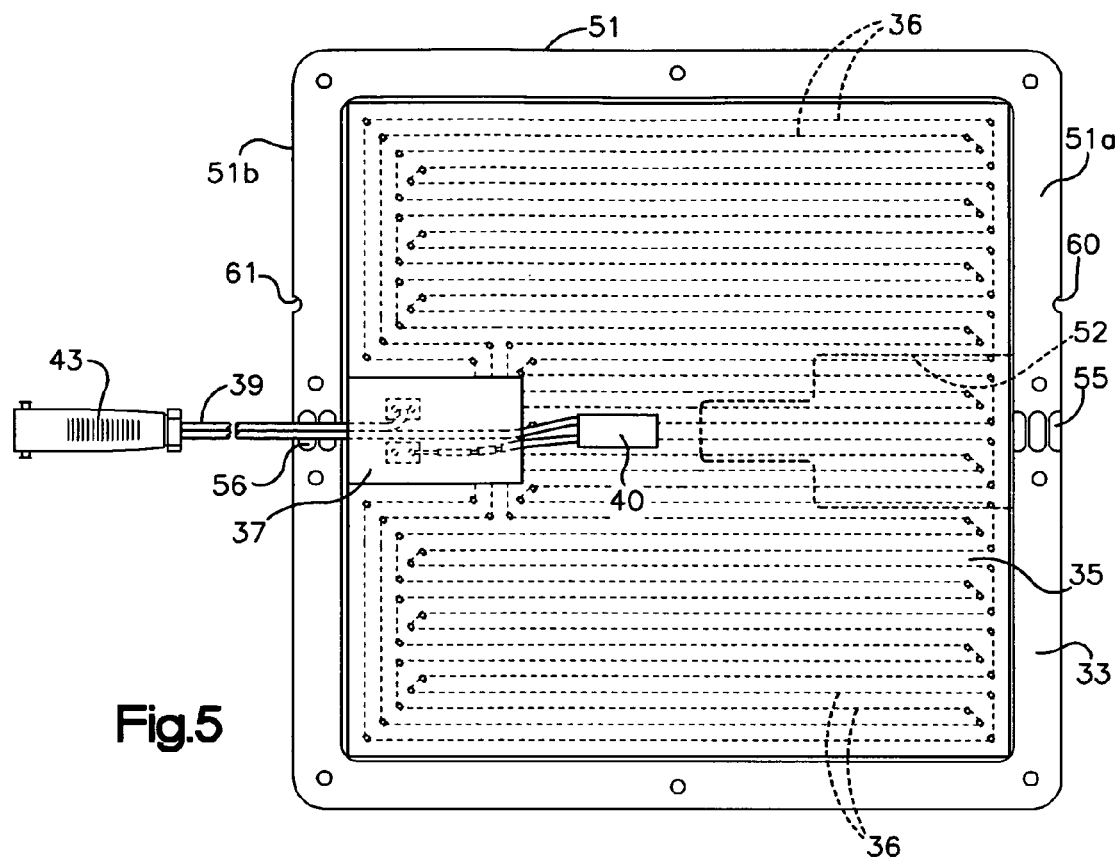
FIG. 5 is a plan view of the heater element taken in the plane of the line 5—5 of FIG. 1.
Figure 5A:
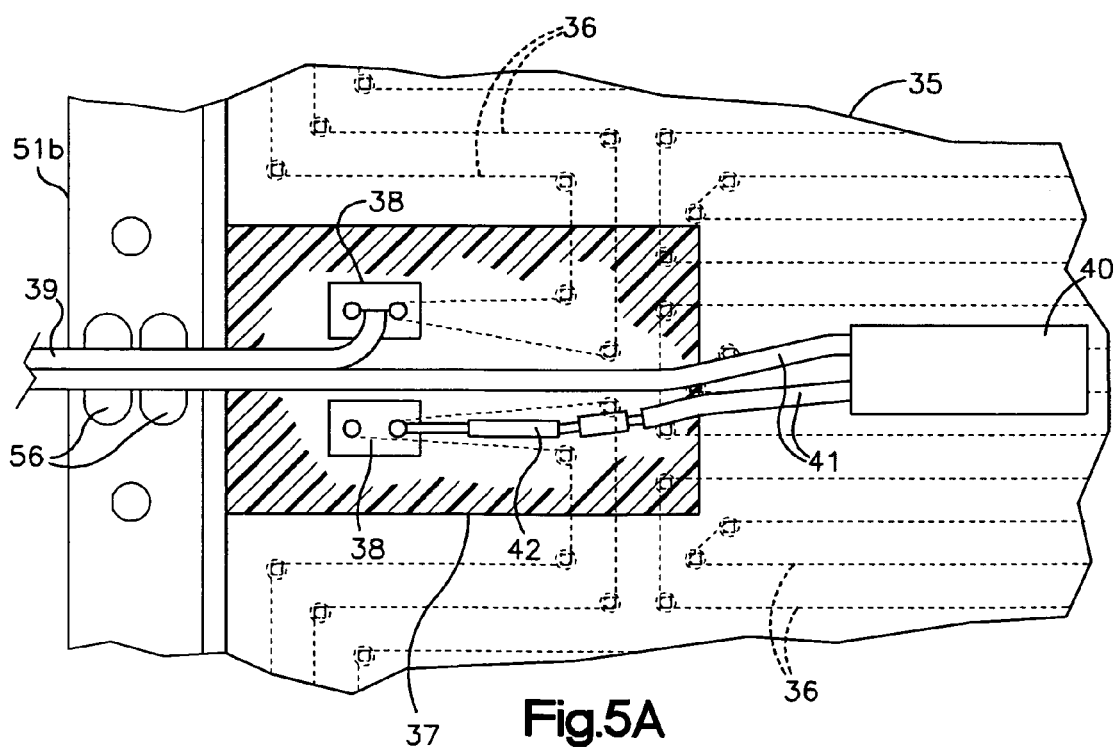
FIG. 5A is an enlarged, fragmentary view of a portion of the heater partially in cross-section.

The heating unit 30 comprises a heat storing shell 31 formed by two plates 33, 34 (FIG. 3) that are riveted together at their edges. The plates 33, 34 contain an electrical heating member 35 which may be comprised of silicone rubber having electrical resistance heating elements 36 embedded therein. The silicone rubber heating member has a raised section or patch 37 that contains soldering pads 38 (FIG. 5A) for connecting the electrical resistance heating elements 36 to a power cord 39. A thermostat and surrounding sleeve 40 is also connected to the soldering pads by wires 41 in circuit relation with the power cord 39 and the electrical resistance heating elements 36. According to one exemplary embodiment, the silicone rubber heating member 35 maintains a heating temperature of about 100° C. as required by the market (although it is capable of reaching temperatures at least 150° C.). The thermostat and sleeve 40 is selected to maintain the desired heating temperature. As shown, a thermal fuse 42 is connected in one of the wires 41. In alternative construction to that shown, a member made of positive temperature coefficient (PTC) material can be substituted for the silicone rubber heating member 35. The electrical resistance of PTC material increases as the temperature goes up to maximum level. Thus, the material self-regulates its heating temperature so that the need for a thermostat is eliminated.

The plates 33, 34 forming the heater shell 31 are molded from a heat storing, thermosetting resin so that the plates will not soften or distort at the required heating temperature. In order to reduce manufacturing expense, the plates 33, 34 are identical in shape so that they can be molded from a single cavity mold. Each plate 33, 34 has a face 50 surrounded by a shallow peripheral rim 51. The height of the rim 51 is such that the heating member 35 will be clamped between the faces 50, thereby minimizing dead air space within the heating unit 30. A cavity 52 is formed in each face 50 adjacent one of the edges of the plate. Each cavity 52 has a main rectangular portion 53 sized to receive the raised patch 37 of the member 35 and a stem portion 54 sized to receive the sleeve and thermostat 40. As shown, the cord 39 is a short pigtail to which a disconnect connector 43 is attached. The connector 43 is a male connector that mates with an extension cord that is plugged into a standard wall outlet. The connector 43 is of a type that permits it to be connected and disconnected under power, i.e., while the mating extension cord remains plugged in an outlet. A connector of this type is sold under the trademark or tradename Hirschmann, and is identified as ST Series.

Figure 2:
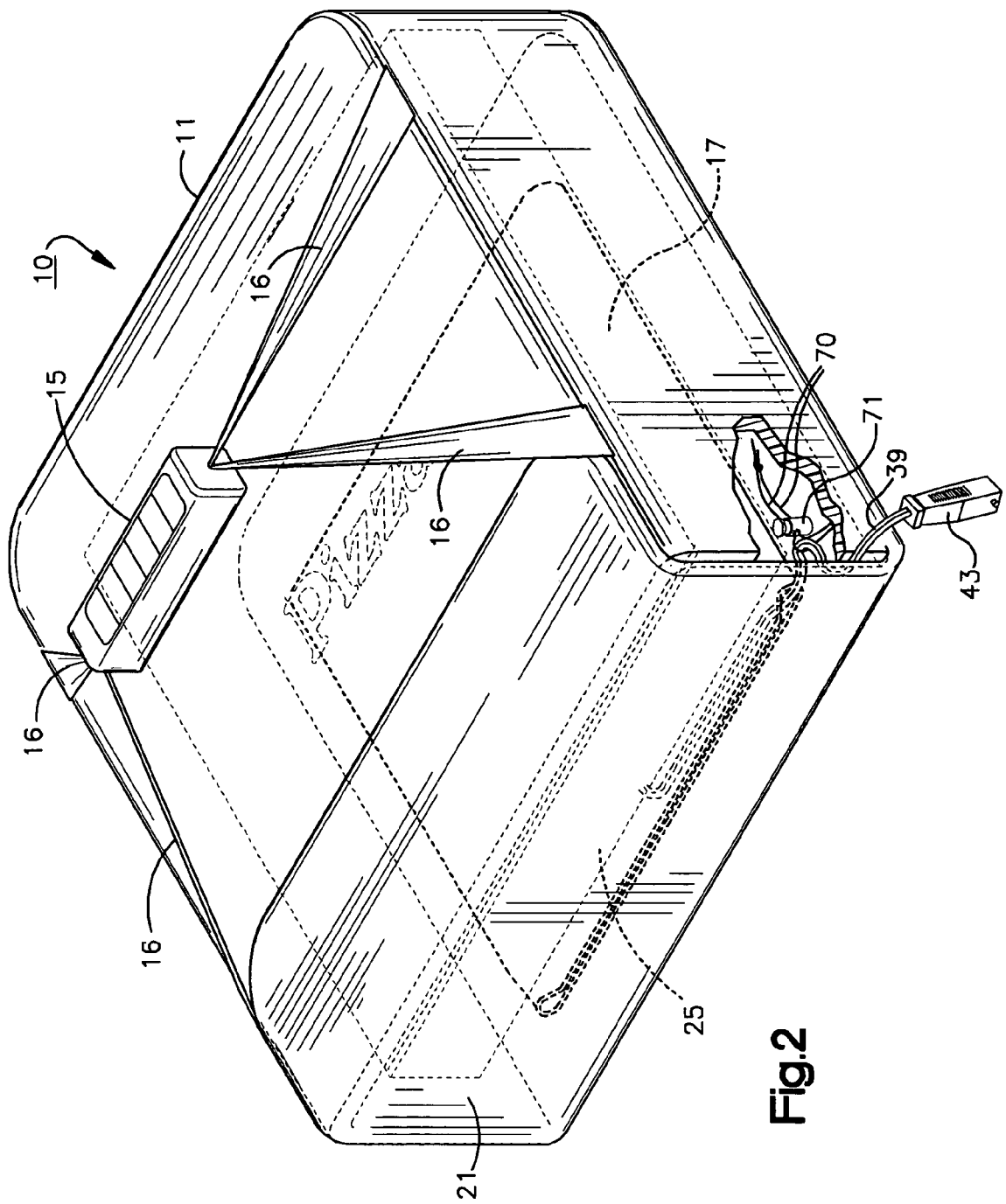
FIG. 2 is a perspective view of the delivery receptacle after being closed.

A strain relief for the power cord 39 is formed by grooves 55 in the plate rim 51*a* next to the cavity 52 and by grooves 56 in the opposite rim portion 51*b*. As shown in FIGS. 1 and 2, a secondary strain relief for the power cord is formed by two cords 70 attached to one side of the receptacle opening 20. The cords 70 extend through a slide 71. When the receptacle or bag is closed, the power cord 39 is placed between the cords 70 and the slide 71 is tightened against the power cord.

During assembly, the two plates 33, 34 are placed face to face and rotated 180 degrees with respect to each other. Notches 60, 61 are formed in opposite rim portions 51*a*, 51*b* of both plates. When the notches 60, 61 are aligned, the assembler is assured that the plates are in the proper position. The silicone rubber heating member 35 is placed between the plates with the patch 37 fitted into the cavity 52 of the plate 34. The cavity containing the patch 37 is closed by the face of the plate 33. This positioning of the plates guards against dead air space in the cavity around the patch 37. As shown in FIG. 4, the power cord 39 is crimped in grooves 56 of the plate 33 by the intermeshing grooves 55 in the plate 34.

The assembled heater unit 30 is placed in the pouch 25 and its mouth 26 is closed with the power cord 39 extending laterally within the pouch to the corner of its mouth. As shown in FIG. 2, the power cord extends out of the pouch 25 at the corner of its mouth between the strain relief cords 70 and then out of the receptacle 11 at the corner of the folded closure flap 21. The cord 39 and connector 43 extend only a short distance from the closed receptacle 11, for example, about four inches. This assures that the cord not become entangled or snagged when the heated bag is moved during delivery.

In use, pizza awaiting delivery is placed in one or more of the delivery systems 10 after baking and the receptacles are closed and connected to a power source to maintain the temperature of the pizza. At the time of delivery, the system is simply disconnected so that the pizza can be delivered while still hot. The construction and operation of the system 10, and, particularly, the heat storing, thermosetting heating unit 30, is such that the bag will maintain the pizza within 10–20° F. of the boxing temperature for up to forty-five minutes so that lasting heat is provided from storage to delivery.

It will be seen from the foregoing that the invention achieves the objectives of providing a heated delivery system which is simple to use, independent of complex hardware, cost effective, dependable and safe. All of which make the product attractive and affordable to both large and small businesses. It will also be seen that the new system provides lasting heat from storage to delivery.

Many variations and modifications of the invention may be apparent to those skilled in the art in light of the foregoing detailed disclosure. Therefore, it is to be understood that, within the scope of the appended claims, the invention can be practiced otherwise than as specifically shown and described.

The invention claimed is:

1. A heated delivery system comprising:
    a) a thermally insulated receptacle having an interior that houses a heated product for delivery and performs as a heated holding oven, an opening provided access to said interior, and a closure flap for said opening,
    b) a pouch on an interior wall of said receptacle, said pouch having a mouth that can be opened and closed,
    c) a heating unit insertable into said pouch through said mouth, said heating unit including a pair of plates molded from thermosetting resin and connected together to form a heat storing shell, each of said plates having a face, a rim surrounding said face, and a cavity in said face, said plates being oriented so that the cavity of one plate is closed by the face of the other plate,
    d) an electrical resistance heating member within said shell, said heating member having a raised area disposed in the cavity of one of said plates, and
    e) a power cord connected to said heat unit said power cord extending out from said pouch and said receptacle to provide a short, external pigtail portion, and a disconnect connector attached to said pigtail portion from mating with an extension cord, whereby said connector and extension cord can be electrically connected and disconnected while said extension cord is plugged into an electrical outlet and is under power.

2. A heated delivery system as claimed in claim 1 wherein said heating member is made of silicone rubber and has electrical resistance elements embedded therein.

3. A heated delivery system comprising:

a) a thermally insulated receptacle having an interior that houses a heated product for delivery and performs as a heated holding oven, an opening providing access to said interior, and a closure flap for said opening;

b) a pouch on an interior wall of said receptacle, said pouch having a mouth that can be opened and closed;

c) a heating unit insertable into said pouch through said mouth, said heating unit including a pair of plates molded from thermosetting resin and connected together to form a heat storing shell, said plates being identical so they can be molded from a single cavity mold, and an electrical resistance heating member within said shell, said member having the capacity of being heated to a desired temperature, and;

d) a power cord connected said heating unit, said power cord extending out from said pouch and said receptacle to provide a short, external pigtail portion, and a disconnect connector attached to said pigtail portion for mating with an extension cord, whereby said connector and extension cord can be electrically connected and disconnected while said extension cord is plugged into an electrical outlet and is under power.

4. A heated delivery system comprising:

a) a thermally insulated receptacle having an interior that houses a heated product for delivery and performs as a heated holding oven, an opening providing access to said interior, and a closure flap for said opening;

b) a pouch on an interior wall of said receptacle, said pouch having a mouth that can be opened and closed;

c) a heating unit insertable into said pouch through said mouth, said heating unit including a pair of plates molded from thermosetting resin and connected together to form a heat storing shell, and an electrical resistance heating member within said shell, said member having the capacity of being heated to a desired temperature;

d) said heating member having a raised area covering electrical connections therein, and each of said plates having a face, a rim surrounding said face, and a cavity in said face, said plates being oriented so that the cavity of one plate is closed by the face of the other plate, said raised area of said heating member being disposed within cavity;

e) a power cord connected said heating unit, said power cord extending out from said pouch and said receptacle to provide a short, external pigtail portion, and a disconnect connector attached to said pigtail portion for mating with an extension cord, whereby said connector and extension cord can be electrically connected and disconnected while said extension cord is plugged into an electrical outlet and is under power.

5. A heated delivery system as claimed in claim 4 wherein said plates have edges secured together, and a strain relief comprising edge portions of said plates that mate to crimp said power cord.

* * * * *